United States Patent
Arinaga et al.

(10) Patent No.: US 7,982,327 B2
(45) Date of Patent: Jul. 19, 2011

(54) WIND TURBINE GENERATOR SYSTEM AND CONTROL METHOD OF THE SAME

(75) Inventors: Shinji Arinaga, Nagasaki (JP); Tsuyoshi Wakasa, Nagasaki (JP); Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/916,196

(22) Filed: Oct. 29, 2010

(65) Prior Publication Data

US 2011/0089694 A1  Apr. 21, 2011

Related U.S. Application Data

(63) Continuation of application No. PCT/JP2008/068764, filed on Oct. 16, 2008.

(51) Int. Cl.
*F03D 9/00* (2006.01)
*H02P 9/00* (2006.01)

(52) U.S. Cl. .......................................... 290/44; 700/286
(58) Field of Classification Search ...................... 290/44
See application file for complete search history.

(56) References Cited

U.S. PATENT DOCUMENTS

| | | | |
|---|---|---|---|
| 4,160,170 A | 7/1979 | Harner et al. | |
| 4,161,658 A * | 7/1979 | Patrick | 290/44 |
| 4,420,692 A | 12/1983 | Kos et al. | |
| 4,584,486 A | 4/1986 | Quynn | |
| 4,698,736 A | 10/1987 | Higa | |
| 4,700,081 A | 10/1987 | Kos et al. | |
| 4,703,189 A | 10/1987 | DiValentin et al. | |
| 6,137,187 A | 10/2000 | Mikhail et al. | |
| 7,042,110 B2 * | 5/2006 | Mikhail et al. | 290/44 |
| 7,268,443 B2 * | 9/2007 | Kikuchi et al. | 290/44 |
| 7,456,510 B2 * | 11/2008 | Ito et al. | 290/44 |
| 7,528,496 B2 | 5/2009 | Fortmann | |
| 7,586,205 B2 | 9/2009 | Krueger | |
| 7,613,548 B2 | 11/2009 | Cardinal et al. | |
| 7,629,702 B2 | 12/2009 | Schubert | |
| 7,649,277 B2 * | 1/2010 | Nitzpon et al. | 290/55 |
| 7,692,321 B2 | 4/2010 | Jones et al. | |
| 7,728,452 B2 | 6/2010 | Arinaga et al. | |

(Continued)

FOREIGN PATENT DOCUMENTS

JP  60240882 A  11/1985

(Continued)

*Primary Examiner* — Joseph Waks
(74) *Attorney, Agent, or Firm* — Lowe Hauptman Ham & Berner LLP

(57) ABSTRACT

A wind turbine generator system includes: a wind turbine rotor including a blade having a variable pitch angle; a generator driven by the wind turbine rotor; and a control unit controlling the output power of the generator and the pitch angle of the blade in response to the rotational speed of the wind turbine rotor or the generator. The control unit performs a first control in which the output power is controlled in accordance with a predetermined power-rotational speed curve until the rotational speed is increased to reach a predetermined rated rotational speed, and performs a second control in which the output power is controlled to a predetermined rated power when the rotational speed exceeds the rated rotational speed; the control unit is responsive to the pitch angle for maintaining a state of performing the second control is or for switching to a state of performing the first control, when the rotational speed is reduced below the rated rotational speed after the control unit is once placed into the state of performing the second control.

8 Claims, 12 Drawing Sheets

U.S. PATENT DOCUMENTS

| | | | |
|---|---|---|---|
| 7,880,321 B2 * | 2/2011 | Arinaga et al. | 290/44 |
| 2003/0151259 A1 * | 8/2003 | Feddersen et al. | 290/44 |
| 2005/0146141 A1 | 7/2005 | Basteck | |
| 2006/0028025 A1 | 2/2006 | Kikuchi et al. | |
| 2006/0273595 A1 | 12/2006 | Avagliano et al. | |
| 2007/0108771 A1 | 5/2007 | Jones et al. | |
| 2007/0170724 A1 | 7/2007 | Calley | |
| 2007/0267873 A1 | 11/2007 | Teichmann | |
| 2008/0007121 A1 | 1/2008 | Erdman et al. | |
| 2008/0150282 A1 | 6/2008 | Rebsdorf et al. | |
| 2009/0058086 A1 | 3/2009 | Arinaga et al. | |
| 2009/0174187 A1 | 7/2009 | Nyborg | |
| 2009/0184519 A1 * | 7/2009 | Nies et al. | 290/44 |
| 2009/0261589 A1 * | 10/2009 | Oohara et al. | 290/44 |
| 2011/0031748 A1 * | 2/2011 | Arinaga et al. | 290/44 |

FOREIGN PATENT DOCUMENTS

| | | |
|---|---|---|
| JP | 62118069 | 5/1987 |
| JP | 62123994 | 6/1987 |
| JP | 62123999 A | 6/1987 |
| JP | 2001512804 | 8/2001 |
| JP | 2007231778 | 9/2007 |

* cited by examiner

Fig. 6

| WIND TURBINE OPERATION STATE | | | | POWER CONTROL | | | | PITCH CONTROL | |
|---|---|---|---|---|---|---|---|---|---|
| | ROTATION SPEED $\omega$ | CHANGE IN ROTATION SPEED | PITCH ANGLE $\beta$ | ROTATION SPEED COMMAND $\omega_P{}^*$ | POWER COMMAND LOWER LIMIT $P_{min}$ | POWER COMMAND UPPER LIMIT $P_{max}$ | REAL POWER COMMAND $P^*$ | ROTATION SPEED COMMAND $\omega_\beta{}^*$ | PITCH COMMAND $\beta^*$ |
| (1) | $\omega \leq \omega_M$ | ACCELERATION/ DECELERATION | — | $\omega_{min}$ | 0 | $P_{opt}$ $(=K\omega^3)$ | PI CONTROL | $\omega_{max}$ | PI CONTROL |
| (2) | $\omega_M < \omega < \omega'_M$ | ACCELERATION $\omega_{min} \to \omega$ | — | $\omega_{max}$ | $P_{opt}$ $(=K\omega^3)$ | $P_{rated}$ | PI CONTROL | $\omega_{max}$ | INTERFERENCE SUPPRESSION CONTROL |
| (3) | $\omega \geq \omega'_M$ | | $\beta = \beta_{min}$ NOT ALLOWED TO FURTHER MOVE TOWARD FINE POSITION | $\omega_{max}$ | $P_{opt}$ | $P_{rated}$ | PI CONTROL | $\omega_{max}$ | INTERFERENCE SUPPRESSION CONTROL |
| (4) | | ACCELERATION/ DECELERATION | $\beta > \beta_{min}$ ALLOWED TO MOVE TOWARD FINE POSITION | $\omega_{max}$ | SMALLER ONE OF ONE-STEP PREVIOUS $P^*$ AND CURRENT $P_{max}$ | $P_{rated}$ | PI CONTROL | $\omega_{max}$ | INTERFERENCE SUPPRESSION CONTROL |
| (5) | $\omega_M < \omega < \omega'_M$ | DECELERATION $\omega_{max} \to \omega$ | — | $\omega_{max}$ | $P_{opt}$ $(=K\omega^3)$ | $P_{rated}$ | PI CONTROL | $\omega_{max}$ | PI CONTROL |

$\omega_M = (\omega_{min} + \omega_{max})/2$
$\omega'_M = (\omega_M + \omega_{max})/2$

WIND TURBINE GENERATOR SYSTEM AND CONTROL METHOD OF THE SAME

RELATED APPLICATION

This application is a continuation of International Application No. PCT/JP2008/068764, filed on Oct. 16, 2008.

BACKGROUND OF THE INVENTION

1. Field of the Invention

The present invention relates to a wind turbine generator system and method for controlling the same, particularly, to control of the output power and the pitch angle of a wind turbine generator system adopting a variable-speed and variable-pitch control method.

2. Description of the Related Art

One of the promising control methods for a wind turbine generator system is a variable-speed and variable-pitch control method, in which the rotational speed of the wind turbine rotor (that is, the rotational speed of the generator) is variable and the pitch angle of the blades is variable. Advantages of the variable-speed and variable-pitch control method include increased energy capture from the wind and decreased output fluctuation.

With respect to the variable-speed and variable-pitch control method, it is of importance to optimize the control of the output power of the generator and the pitch angle of the blades. Japanese Translation of International Publication No. 2001-512804 discloses a control method in which the torque of the generator is controlled with a field orientation control while the pitch angle is controlled independently of the torque of the generator. In the disclosed control method, desired output power of the generator is determined in response to the rotational speed of the generator using a lookup table, and a torque command for the generator is determined from the desired output power. The torque of the generator is controlled by a field orientation control in response to the torque command. On the other hand, the pitch angle of the blades is controlled by PID control, PI control or PD control responsive to the deviation between the rotational speed of the generator and a desired rotational speed.

One issue for the wind turbine generator system is how to deal with occurrence of a transient wind null, that is, a short-time reduction in the wind speed. Generally, a wind turbine generator system is designed to generate rated power in a case where the rotational speed of the wind turbine rotor is equal to or higher than a rated rotational speed. In such a wind turbine generator system, the output power is reduced below the rated power, when the rotational speed of the wind turbine rotor is reduced below the rated rotational speed due to the occurrence of the transient wind null. This causes output power fluctuation and generation efficiency reduction.

SUMMARY OF INVENTION

Therefore, an object of the present invention is to provide a wind turbine generator system which suppresses output power fluctuation and generation efficiency reduction even when a transient wind null occurs.

In an aspect of the present invention, a wind turbine generator system includes: a wind turbine rotor including a blade having a variable pitch angle; a generator driven by the wind turbine rotor; and a control unit controlling the output power of the generator and the pitch angle of the blade in response to the rotational speed of the wind turbine rotor or the generator. The control unit performs a first control in which the output power is controlled in accordance with a predetermined power-rotational speed curve until the rotational speed increases and reaches a predetermined rated rotational speed, and performs a second control in which the output power is controlled to a predetermined rated power when the rotational speed exceeds the rated rotational speed; the control unit is responsive to the pitch angle for maintaining a state of performing the second control is or for switching to a state of performing the first control, when the rotational speed is reduced below the rated rotational speed after the control unit is once placed into the state of performing the second control. Here, the pitch angle is an angle formed between a chord of the blade and a rotation plane of the wind turbine rotor. Namely, the wind turbine rotor extracts more energy from wind when the pitch angle is small, and the wind turbine rotor extracts less energy from the wind when the pitch angle is large.

The wind turbine generator system configured as stated above can suppress the output power fluctuation by using the rotational energy of the wind turbine rotor when the wind speed is reduced only for a short time. This is because the wind turbine generator system according to the present invention keeps the output power at the predetermined rated power in response to the pitch angle of the blade, when said rotational speed is reduced below said rated rotational speed. When it is determined from the pitch angle of the blade that the system is in a state in which the output power can be kept at the predetermined rated power, the output power is kept at the rated power, and this allows effectively extracting the rotational energy of the wind turbine rotor and suppressing the output power fluctuation and the power generation efficiency reduction.

Preferably, in a case where the rotational speed is reduced below the rated rotational speed after the control unit is once placed into the state of performing the second control, the control unit maintains the state of performing said second control for a case when the pitch angle is larger than a predetermined pitch angle, not switching to the state of performing the first control until the pitch angle reaches the predetermined pitch angle. In this case, said control unit is preferably switched to the state of performing said first control irrespectively of said pitch angle, when said rotational speed is reduced below a predetermined threshold rotation speed which is lower than said rated rotational speed after the control unit is once placed into the state of performing said second control.

Preferably, the control unit controls said pitch angle in response to the difference between the rotational speed of the wind turbine rotor or the generator and the predetermined rated rotational speed and the difference between the output power and the rated power.

In this case, the control unit preferably controls the pitch angle to be reduced when the output power is lower than the rated power.

The control unit preferably increases the output power of the generator in response to said rotational speed when a gust is detected.

In a case where the wind turbine generator system further includes: a rotation mechanism rotating a direction of the rotational surface of the wind turbine rotor; and a wind direction detector detecting a windward direction and the wind turbine rotor includes a pitch drive mechanism driving the blade, it is preferable that the control unit controls the rotation mechanism so as to move the rotation plane of the wind turbine rotor away from the windward direction when detecting a failure in the pitch drive mechanism.

Preferably, the control unit controls reactive power outputted from the generator to a power grid connected to the generator in response to a voltage of the power grid, and controls the pitch angle in response to said reactive power.

In a case where the wind turbine generator system further includes an emergency battery and a battery charger charging the emergency battery with power received from the power grid, wherein the wind turbine rotor includes a pitch drive mechanism driving the blade and wherein the emergency battery supplies power to the pitch drive mechanism and the control unit when the voltage of the power grid connected to the generator is reduced, the control unit preferably controls the output power to be increased while the emergency battery is being charged.

A method of controlling a wind turbine generator system according to the present invention is a method of controlling a wind turbine generator system provided with: a wind turbine rotor including a blade having a variable pitch angle; and a generator driven by the wind turbine rotor. The control method includes a control step of controlling output power of the generator and a pitch angle of the blade in response to the rotational speed of the wind turbine rotor or the generator. Said control step includes steps of:

(A) performing a first control in which said output power is controlled in accordance with to a predetermined power-rotational speed curve until said rotational speed increases to reach a predetermined rated rotational speed;

(B) performing a second control in which said output power is controlled to a predetermined rated power when said rotational speed exceeds said rated rotational speed; and (C) in response to said pitch angle, maintaining the state of performing said second control or switching to the state of performing said first control, when said rotational speed is reduced below the rated rotational speed after the state of performing said second control is once established.

The present invention provides a wind turbine generator system which can suppress output power fluctuation and generation efficiency reduction even when a transient wind null occurs.

BRIEF DESCRIPTION OF DRAWINGS

FIG. 6 is a table explaining operations performed by a power controller and a pitch controller of the wind turbine generator system of the present embodiment;

DESCRIPTION OF PREFERRED EMBODIMENTS

Figure 1:
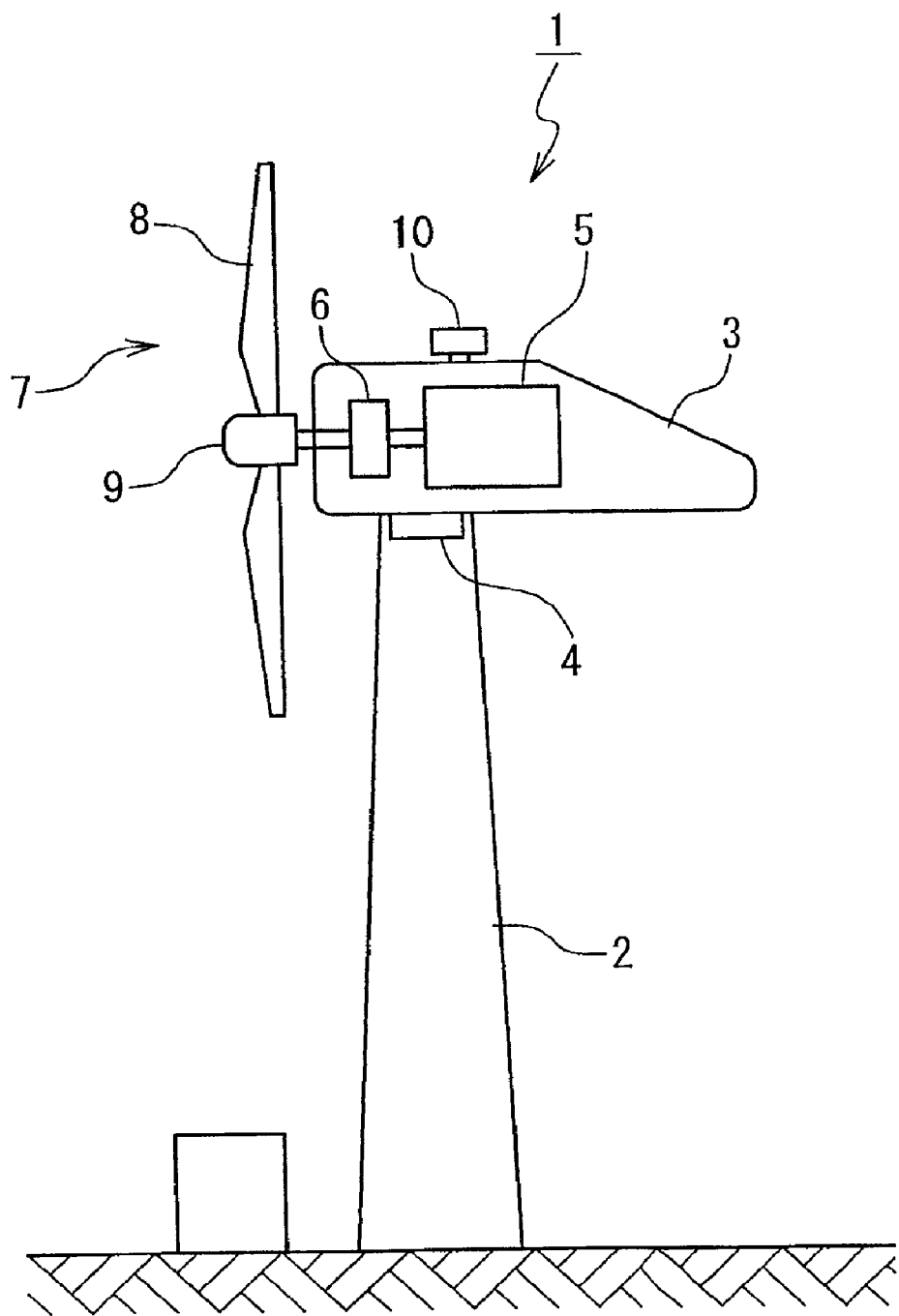
FIG. 1 is a side view showing the configuration of a wind turbine generator system in one embodiment of the present invention.

FIG. 1 is a side view showing the configuration of a wind turbine generator system 1 in one embodiment of the present invention. The wind turbine generator system 1 is provided with a tower 2 and a nacelle 3 provided on the top end of the tower 2. The nacelle 3 is rotatable in the yaw direction and directed to a desired direction by a nacelle rotation mechanism 4. Mounted in the nacelle 3 are a wound-rotor induction generator 5 and a gear 6. The rotor of the wound-rotor induction generator 5 is connected to a wind turbine rotor 7 through the gear 6.

Figure 2:
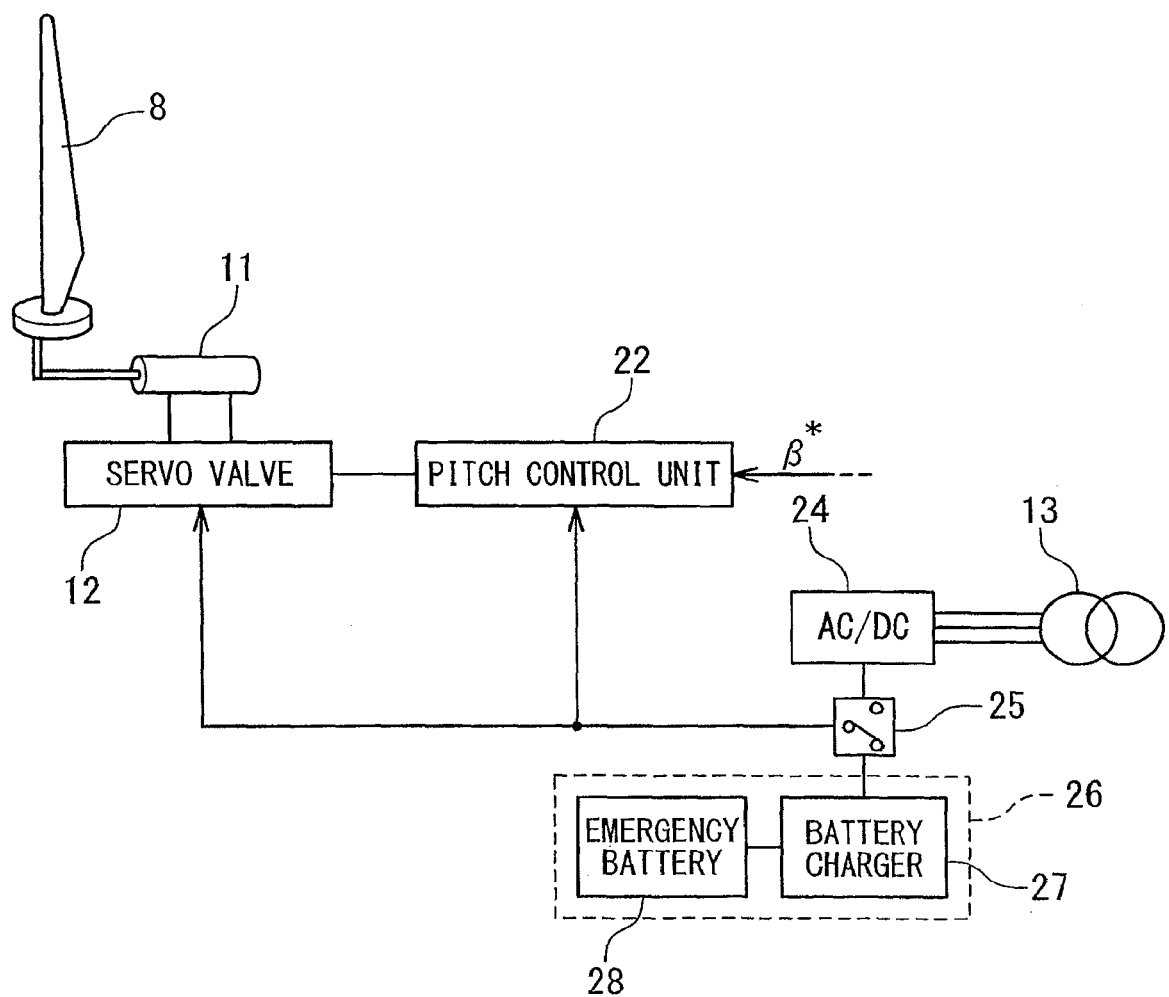
FIG. 2 is a block diagram showing the configuration of a pitch drive mechanism of the wind turbine generator system of the present embodiment.

The wind turbine rotor 7 includes blades 8 and a hub 9 supporting the blades 8. The blades 8 are provided so that the pitch angle thereof is variable. More specifically, as shown in FIG. 2, the hub 9 contains therein hydraulic cylinders 11 driving the blades 8 and servo valves 12 supplying hydraulic pressure to the hydraulic cylinders 11. The hydraulic pressure supplied to the hydraulic cylinders 11 is controlled by the openings of the servo valves 12, thereby controlling the blades 8 to a desired pitch angle.

Referring back to FIG. 1, the nacelle 3 additionally includes an anemometer 10. The anemometer 10 measures the wind speed and the wind direction. As described later, the nacelle 3 is rotated in response to the wind speed and the wind direction measured by the anemometer 10.

Figure 3:
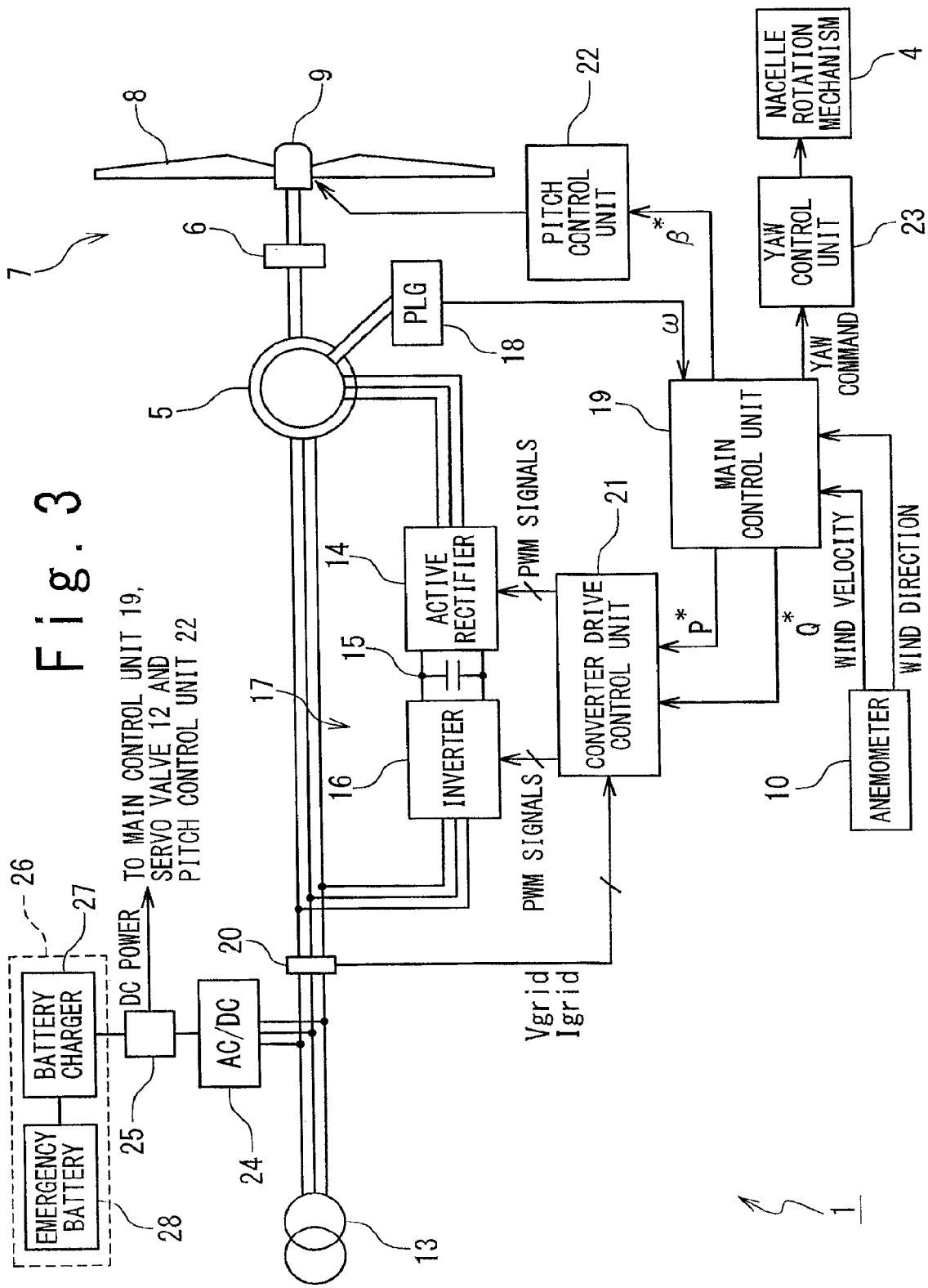
FIG. 3 is a block diagram showing the configuration of the wind turbine generator system of the present embodiment.

FIG. 3 is a block diagram showing details of the configuration of the wind turbine generator system 1. The wind turbine generator system 1 in this embodiment is a sort of doubly-fed variable speed wind turbine system. Namely, the wind turbine generator system 1 of this embodiment is configured to output the power generated by the wound-rotor induction generator 5 to the power grid 13 from both of the stator and rotor windings. Specifically, the wound-rotor induction generator 5 has the stator winding directly connected to the power grid 13 and the rotor winding connected to the power grid 13 through an AC-DC-AC converter 17.

The AC-DC-AC converter 17, which includes an active rectifier 14, a DC bus 15 and an inverter 16, converts AC power received from the rotor winding into AC power adapted to the frequency of the power grid 13. The active rectifier 14 converts the AC power generated by the rotor winding into DC power and outputs the DC power to the DC bus 15. The inverter 16 converts the DC power received from the DC bus 15 into AC power of a frequency equal to that of the power grid 13 and outputs the AC power to the power grid 13. The output power which the wound-rotor induction generator 5 outputs to the power grid 13 is controlled by the active rectifier 14 and the inverter 16.

The AC-DC-AC converter 17 also has a function of converting AC power received from the power grid 13 into AC power adapted to the frequency of the rotor winding, and the AC-DC-AC converter 17 is used to excite the rotor winding, depending on the operating state of the wind turbine generator system 1. In this case, the inverter 16 converts the AC power into the DC power and outputs the DC power to the DC bus 15. The active rectifier 14 converts the DC power received from the DC bus 15 into the AC power adapted to the frequency of the rotor winding and supplies the AC power to the rotor winding of the wound-rotor induction generator 5.

A control system of the wind turbine generator system 1 includes a PLG (pulse logic generator) 18, a main control unit 19, a voltage/current sensor 20, a converter drive control unit 21, a pitch control unit 22, and a yaw control unit 23.

The PLG 18 measures the rotational speed ω of the wound-rotor induction generator 5 (hereinafter, referred to as the generator rotational speed ω).

The main control unit 19 generates an real power command P*, a reactive power command Q* and a pitch angle command β*, in response to the generator rotational speed ω measured by the PLG 18, and also generates a yaw command in response to the wind speed and the wind direction measured by the anemometer 10. As described later in detail, one feature of the wind turbine generator system 1 of this embodiment is a control algorithm for generating the real power command P* and the pitch angle command β*.

The voltage/current sensor 20, which is provided on power lines connected between the wound-rotor induction generator 5 and the power grid 13, measures the voltage $V_{grid}$ of the power grid 13 ("grid voltage") and the output current $I_{grid}$ outputted from the wound-rotor induction generator 5 to the power grid 13.

The converter drive control unit 21 controls real power P and reactive power Q outputted to the power grid 13 in response to the real power command P* and the reactive power command Q*, respectively. The converter drive control unit 21 also controls the turn-on-and-off of power transistors within the active rectifier 14 and the inverter 16. Specifically, the converter drive control unit 21 calculates the real power P and the reactive power Q to be outputted to the power grid 13 from the voltage $V_{grid}$ and the output current $I_{grid}$ measured by the voltage/current sensor 20. Further, the converter drive control unit 21 generates PWM signals for the PWM control in response to the difference between the real power P and the real power command P* and the difference between the reactive power Q and the reactive power command Q*, and supplies the generated PWM signals to the active rectifier 14 and the inverter 16. The real power P and the reactive power Q outputted to the power grid 13 are thereby controlled.

The pitch control unit 22 controls the pitch angle β of the blades 8 in response to the pitch angle command β* transmitted from the main control unit 19. The pitch angle β of the blades 8 is controlled to coincide with the pitch angle command β*.

The yaw control unit 23 controls the nacelle rotation mechanism 4 in response to the yaw command transmitted from the main control unit 19. The nacelle 3 is oriented to the direction indicated by the yaw command.

An AC/DC converter 24 is connected to the power lines connected between the power grid 13 and the wound-rotor induction generator 5. The AC/DC converter 24 generates DC power from AC power received from the power grid 13. The AC/DC converter 24 supplies the DC power to the control system of the wind turbine generator system 1, particularly to the servo valves 12, the main control unit 19, and the pitch control unit 22 used to control the pitch angle β of the blades 8.

Moreover, the wind turbine generator system 1 is provided with an uninterruptible power supply system 26 which includes a battery charger 27 and an emergency buttery 28 so as to stably supply DC power to the servo valves 12, the main control unit 19, and the pitch control unit 22. From requirements of wind turbine generator system standards, it is necessary for the wound-rotor induction generator 5 to remain connected to the power grid 13 even when the grid voltage $V_{grid}$ falls. This requires appropriately controlling the pitch angle of the blades 8 to thereby maintain the rotational speed of the wound-rotor induction generator 5 to a desired value even when the voltage of the power grid 13 falls. To satisfy such requirements, when the grid voltage $V_{grid}$ falls to a predetermined voltage, the uninterruptible power supply system 26 is connected to the servo valves 12, the main control unit 19, and the pitch control unit 22 by a switch 25, to supply power from the emergency battery 28 to the servo valves 12, the main control unit 19, and the pitch control unit 22. The pitch angle of the blades 8 is thereby kept controlled. The emergency battery 28 is connected to the battery charger 27. The battery charger 27 charges the emergency battery 28 with the DC power supplied from the AC/DC converter 24.

Figure 4:
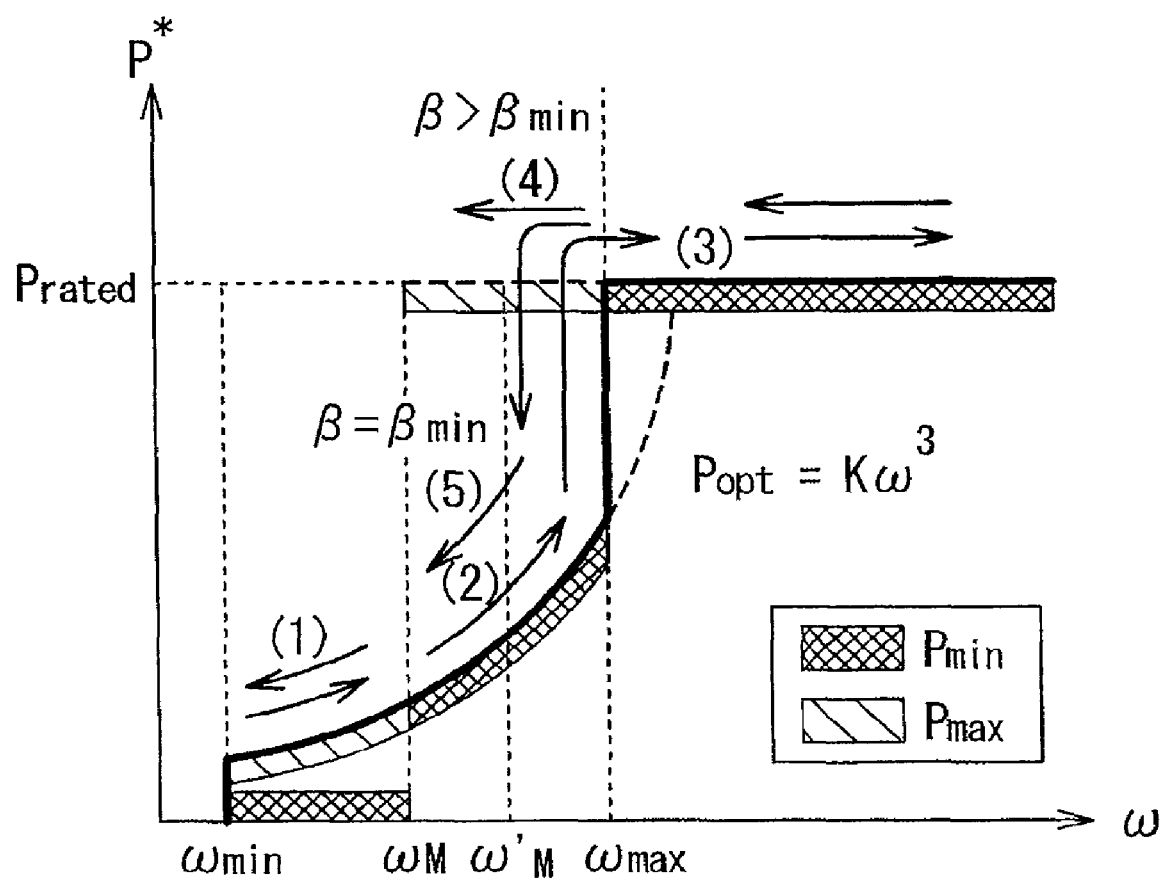
FIG. 4 is a graph showing a power control method performed by the wind turbine generator system of the present embodiment.

One feature of the wind turbine generator system 1 of this embodiment is optimized control of the output power P of the wound-rotor induction generator 5. FIG. 4 is a graph showing the relationship between the real power command P* and the rotational speed ω of the wound-rotor induction generator 5, depicting a method of controlling the output power P performed by the wind turbine generator system 1 of this embodiment.

When the generator rotational speed ω is lower than a minimum rotational speed $ω_{min}$, the real power command P* for the wound-rotor induction generator 5 is controlled to zero. The minimum rotational speed $ω_{min}$ is a minimum rotational speed at which power can be generated by the wound-rotor induction generator 5, and the minimum rotational speed $ω_{min}$ is determined in accordance with characteristics of the wind turbine generator system 1.

When the generator rotational speed ω is higher than the minimum rotational speed $ω_{min}$, the real power command P* is controlled in one control mode selected from two control modes: an optimum curve control mode and a rated value control mode.

In the optimum curve control mode, the real power command P* is controlled to coincide with an optimized power $P_{opt}$ defined by the following Equation (1):

$$P_{opt}=Kω^3, \quad (1)$$

where K is a predetermined constant. It is known that it is optimum for the wind turbine generator system 1 to control the output power to be proportional to the cube of the generator rotational speed, and accordingly, the output power P is controlled to be proportional to the cube of the generator rotational speed ω in the first control mode.

The optimum curve control mode is used mainly in a range in which the generator rotational speed ω is higher than the minimum rotational speed $ω_{min}$ and lower than a rated rotational speed $ω_{max}$. Note that the rated rotational speed $ω_{max}$ is the rotational speed at which the wound-rotor induction generator 5 operates in the steady operation. The generator rotational speed ω is controlled to the rated rotational speed $ω_{max}$ (if possible) by controlling the pitch angle of the blades 8.

In the rated value control mode, on the other hand, the output power P is controlled to the rated power $P_{rated}$. The rated value control mode is used mainly in a range in which the generator rotational speed ω is equal to or higher than the rated rotational speed $ω_{max}$. In a steady condition in which wind blows with a rated wind speed, the generator rotational speed ω is controlled to the rated rotational speed $\omega_{max}$ and the output power P is controlled to the rated power $P_{rated}$.

An important feature of the wind turbine generator system 1 of this embodiment is in a fact that switching from the rated value control mode to the optimum curve control mode is made in response to the pitch angle β of the blades 8. When the generator rotational speed ω is increased to reach the rated rotational speed $\omega_{max}$, the power control is switched from the optimum curve control mode to the rated value control mode. When the generator rotational speed ω is decreased below the rated rotational speed $\omega_{max}$, on the other hand, the pitch angle β is first reduced. The power control is not switched from the rated value control mode to the optimum curve control mode until the pitch angle β reaches a minimum value $\beta_{min}$. Namely, the real power command P* is switched from the rated power $P_{rated}$ to the optimized power value $P_{opt}$. In other words, the real power command P* is kept at the rated power $P_{rated}$ unless the pitch angle β reaches the minimum value $\beta_{min}$ (that is, the pitch angle command β* reaches the minimum value $\beta_{min}$). It should be noted that the fact that the pitch angle β is set to the minimum angle $\beta_{min}$ implies that the output coefficient of the wind turbine rotor 7 is maximum with the pitch angle β set to the fine-side limit value, since the pitch angle β is the angle formed between the chords of the blades 8 and the rotation plane of the wind turbine rotor.

The control in which the output power P is kept at the rated power $P_{rated}$ until the pitch angle β reaches the minimum value $\beta_{min}$ is effective for suppressing output power fluctuation and avoiding generation efficiency reduction when a transient wind null occurs. Under the above-described control, the real power command P* is kept at the rated power $P_{rated}$ when the generator rotational speed ω is reduced below the rated rotational speed $\omega_{max}$ if such state continues only for a short time, and thereby the fluctuation in the output power P is suppressed. Furthermore, the wind turbine generator system 1 of this embodiment allows making effective use of rotational energy of the wind turbine rotor 7, effectively improving the generation efficiency, since the output power P is not reduced from the rated power $P_{rated}$ until the increase in the output coefficient of the wind turbine rotor 7 through the reduction in the pitch angle β becomes impossible, when the generator rotational speed ω is reduced below the rated rotational speed $\omega_{max}$.

It should be noted that the power control is switched from the rated value control mode to the optimum curve control mode irrespectively of the pitch angle β (or the pitch angle command β*), when the generator rotational speed ω is reduced below a predetermined threshold rotational speed $\omega'_M$ which is lower than the rated rotational speed $\omega_{max}$. It is unpreferable for securing the control stability to maintain the output power P at the rated power $P_{rated}$ when the generator rotational speed ω is excessively low. It is preferable that the threshold rotational speed $\omega'_M$ is determined by the following equation:

$$\omega'_M = (\omega_M + \omega_{max})/2,$$

where $\omega_M$ is an intermediate rotational speed defined as:

$$\omega_M = (\omega_{max} + \omega_{min})/2.$$

Figure 5:
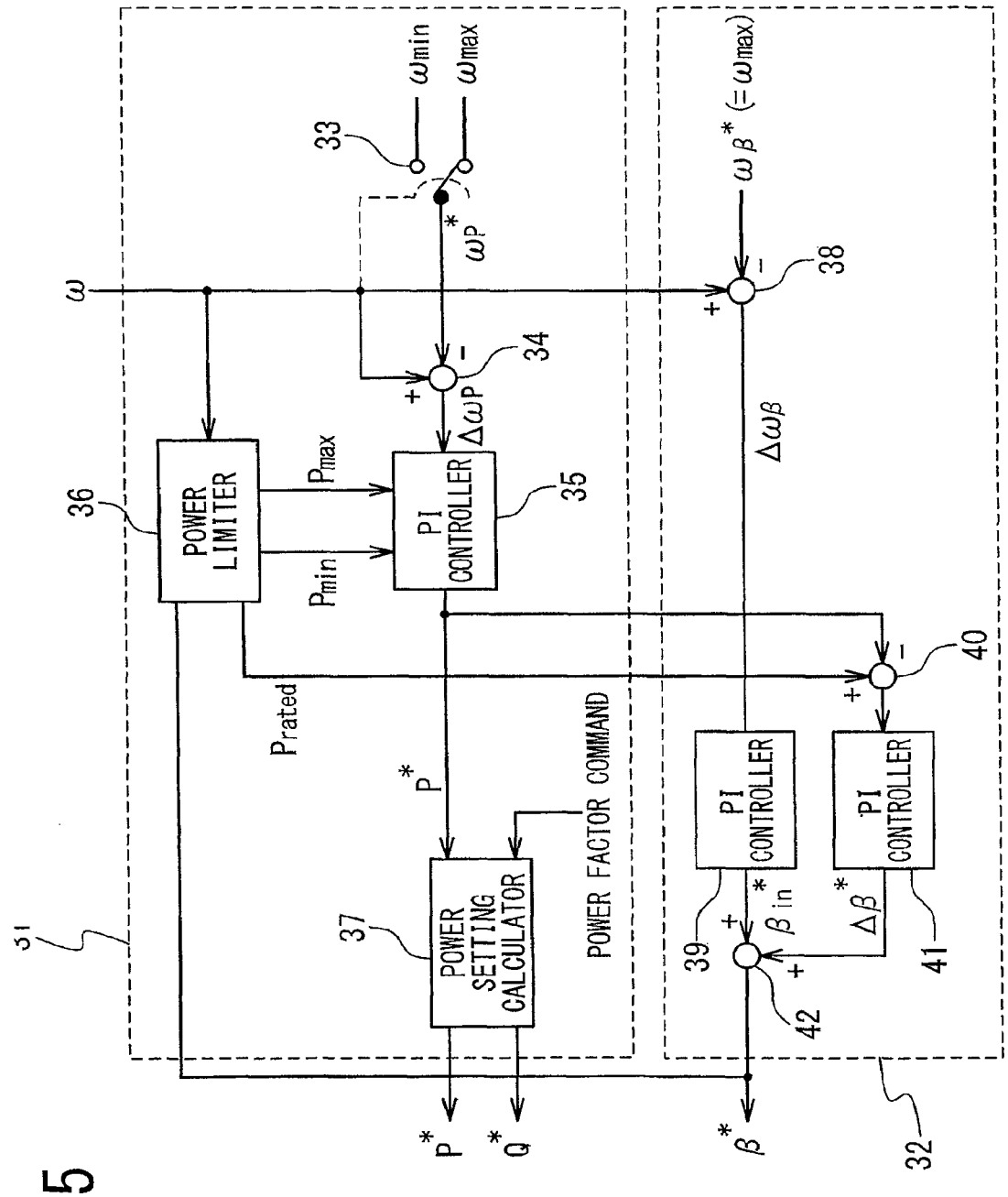
FIG. 5 is a block diagram showing an example of the configuration of a main control unit of the wind turbine generator system of the present embodiment.

FIG. 5 is a block diagram showing an example of a configuration of the main control unit 19 for realizing a control shown in FIG. 4. It should be noted that FIG. 5 shows only one example of the configuration of the main control unit 19; the main control unit 19 may be implemented as hardware, software, or a combination of hardware and software. The main control unit 19 includes a power control module 31 generating the real power command P* and the reactive power command Q* and a pitch control module 32 generating the pitch angle command β*.

The power control module 31 includes a selector 33, a subtracter 34, a PI controller 35, a power limiter 36, and a power setting calculator 37. On the other hand, the pitch control module 32 includes a subtracter 38, a PI controller 39, a subtracter 40, a PI controller 41, and an adder 42. The selector 33, the subtracter 34, the PI controller 35, the power limiter 36, the power setting calculator 37, the subtracter 38, the PI controller 39, the subtracter 40, the PI controller 41, and the adder 42 perform respective calculation steps synchronously with a clock used in the main control unit 19, and the real power command P*, the reactive power command Q*, and the pitch angle command β* are thereby generated.

In detail, the selector 33 selects one of the minimum rotational speed $\omega_{min}$ and the rated rotational speed $\omega_{max}$ as a power control rotational speed command $\omega_P^*$ in response to the generator rotational speed ω. More specifically, the selector 33 sets the power control rotational speed command $\omega_P^*$ to the minimum rotational speed $\omega_{min}$, when the generator rotational speed ω is equal to or lower than the intermediate rotational speed $\omega_M$, and sets the power control rotational speed command $\omega_P^*$ to the rated rotational speed $\omega_{max}$, when the generator rotational speed ω is higher than the intermediate rotational speed $\omega_M$.

The subtracter 34 calculates the deviation $\Delta\omega_P$ by subtracting the power control rotational speed command $\omega_P^*$ from the generator rotational speed ω.

The PI controller 35 performs PI control in response to the deviation $\Delta\omega_P$ to generate the real power command P*. Note that the range of the generated real power command P* limited by an power command lower limit $P_{min}$ and an power command upper limit $P_{max}$ supplied from the power limiter 36. Namely, the real power command P* is limited to be equal to or higher than the power command lower limit $P_{min}$ and limited to equal to or lower than power command upper limit $P_{max}$.

The power limiter 36 determines the power command lower limit $P_{min}$ and the power command upper limit $P_{max}$ to be supplied to the PI controller 35 in response to the generator rotational speed ω and the pitch angle command β*. Further, the power limiter 36 supplies the rated power $P_{rated}$ to the subtracter 40 of the pitch control module 32. As described later, the power control shown in FIG. 4 is implemented by appropriately determining the power command lower limit $P_{min}$ and the power command upper limit $P_{max}$ generated by the power limiter 36 as well as the power control rotational speed command $\omega_P^*$ determined by the selector 33.

The power setting calculator 37 generates the reactive power command Q* from the real power command P* generated by the PI controller 35 and a power factor command indicating the power factor of the AC power outputted from the wind turbine generator system 1, and outputs the real power command P* and the reactive power command Q*. As described above, the real power command P* and the reactive power command Q* are used to control the real power P and the reactive power Q outputted from the wind turbine generator system 1, respectively.

On the other hand, the subtracter 38 of the pitch control module 32 calculate the deviation $\Delta\omega_\beta$ by subtracting a pitch control rotational speed command $\omega_\beta^*$ from the generator rotational speed ω. The pitch control rotational speed command $\omega_\beta^*$ is coincident with the rated rotational speed $\omega_{max}$, and therefore the deviation $\Delta\omega_\beta$ represents the difference between the generator rotational speed ω and the rated rotational speed $\omega_{max}$.

The PI controller 39 performs PI control in response to the deviation $\Delta\omega_\beta$ to generate a pitch angle command baseline value $\beta_{in}*$. The pitch angle command baseline value $\beta_{in}*$ mainly controls the finally generated pitch angle command $\beta*$, but the pitch angle command baseline value $\beta_{in}*$ does not always coincide with the pitch angle command $\beta*$. The pitch angle command baseline value $\beta_{in}*$ is determined so that the generator rotational speed $\omega$ is controlled to the rated rotational speed $\omega_{max}$.

The subtracter 40 generates a deviation $\Delta P$ by subtracting the rated power $P_{rated}$ from the real power command $P*$. The PI controller 41 performs the PI control in response to the deviation $\Delta P$ to generate a correction value $\Delta\beta*$. The adder 42 adds up the pitch angle command baseline value $\beta_{in}*$ and the correction value $\Delta\beta*$ to generate the pitch angle command $\beta*$.

The subtracter 40 and the PI controller 41 of the pitch control module 32 have a role to prevent the pitch control module 32 from undesirably interfering with the power control when the generator rotational speed $\omega$ increases up to the rated rotational speed $\omega_{max}$ and the power control is switched from the optimum curve control mode to the rated value control mode. The PI controller 39 of the pitch control module 32 is designed to adjust the generator rotational speed $\omega$ to the rated rotational speed $\omega_{max}$. This may result in that the aerodynamic energy to be extracted as the power is undesirably abandoned. Therefore, in this embodiment, the PI controller 41 generates the correction value $\Delta\beta*$ in response to the difference between the rated power $P_{rated}$ and the real power command $P*$, and the pitch angle command $\beta*$ is corrected with the correction value $\Delta\beta*$. The correction value $\Delta\beta*$ is determined so that the pitch angle command $\beta*$ is smaller than the pitch angle command baseline value $\beta_{in}*$, i.e., the pitch angle $\beta$ is set closer to the fine-side limit value, when the real power command $P*$ is lower than the rated power command $P_{rated}$, i.e., the deviation $\Delta P$ ($=P*-P_{rated}$) is negative. Such control allows avoiding the pitch angle $\beta$ from being closer to the feather-side limit value just before the generator rotational speed $\omega$ reaches the rated rotational speed $\omega_{max}$. After the real power command $P*$ reaches the rated power $P_{rated}$, the deviation $\Delta P$ becomes zero and the correction value $\Delta\beta*$ becomes zero.

FIG. 6 is a table showing operations performed by the power control module 31 and the pitch control module 32 of the main control unit 19. The operations performed by the power control module 31 and the pitch control module 32 will be described for the following five cases:

Case (1): The generator rotational speed $\omega$ is equal to or higher than the minimum rotational speed $\omega_{min}$ and equal to or lower than the intermediate rotational speed $\omega_M$ ($=(\omega_{min}+\omega_{max})/2$).

In this case, the power control rotational speed command $\omega_P*$ is set to the minimum rotational speed $\omega_{min}$ by the selector 33, and the power command lower limit $P_{min}$ and the power command upper limit $P_{max}$ are set to zero and $P_{opt}$ ($=K\omega^3$), respectively. Besides, the real power command $P*$ is always set to the power command upper limit $P_{max}$, since the deviation $\Delta\omega_P$ ($=\omega-\omega_{min}$) is positive and the generator rotational speed $\omega$ is controlled to the rated rotational speed $\omega_{max}$. The real power command $P*$ is eventually set to the optimized power value $P_{opt}$, since the power command upper limit $P_{max}$ is $P_{opt}$. In other words, the power control is set to the optimum curve control mode.

In this case, the pitch angle command $\beta*$ is eventually set to the fine-side limit value, i.e., the minimum pitch angle $\beta_{min}$, since the pitch control module 32 controls the generator rotational speed $\omega$ to the rated rotational speed $\omega_{max}$.

Case (2): The generator rotational speed $\omega$ exceeds the intermediate rotational speed $\omega_M$, whereby the generator rotational speed $\omega$ is in a range where the generator rotational speed $\omega$ is higher than the intermediate rotational speed $\omega_M$ and lower than the threshold rotational speed $\omega'_M$.

In this case, the power control rotational speed command $\omega_P*$ is set to the rated rotational speed $\omega_{max}$ by the selector 33, and the power command lower limit $P_{min}$ and the power command upper limit $P_{max}$ are set to $P_{opt}$ and $P_{rated}$, respectively. In this case, the real power command $P*$ is always set to the power command lower limit $P_{min}$, since the deviation $\Delta\omega_P$ ($=\omega-\omega_{max}$) is negative and the generator rotational speed $\omega$ is controlled to the rated rotational speed $\omega_{max}$ by the pitch control module 32. The real power command $P*$ is eventually set to the optimized power value $P_{opt}$, since the power command lower limit $P_{min}$ is $P_{opt}$. In other words, the power control is set into the optimum curve control mode.

The above-described correction of the pitch angle command $\beta*$ with the correction value $\Delta\beta*$ validly works in the case (2). In the case (2), since the real power command $P*$ is lower than the rated power $P_{rated}$, the deviation $\Delta P$ is negative and the correction value $\Delta\beta*$ is therefore negative. Accordingly, the pitch angle command $\beta*$ is reduced below the pitch angle command baseline value $\beta_{in}*$, that is, the pitch angle $\beta$ is set closer to the fine-side lower limit. This allows converting the aerodynamic energy into the power more effectively.

Case (3): The generator rotational speed $\omega$ is equal to or higher than the threshold rotational speed $\omega'_M$, and the pitch angle $\beta$ does not reach the minimum pitch angle $\beta_{min}$.

In this case, the power control rotational speed command $\omega_P*$ is set to the rated rotational speed $\omega_{max}$ by the selector 33, and the power command lower limit $P_{min}$ and the power command upper limit $P_{max}$ are both set to $P_{rated}$.

When the generator rotational speed $\omega$ is equal to or higher than the threshold rotational speed $\omega'_M$ and lower than the rated rotational speed $\omega_{max}$, the deviation $\Delta\omega_P$ ($=\omega-\omega_{max}$) is negative and the real power command $P*$ is always set to the power command lower limit $P_{min}$. The power command lower limit $P_{min}$ is $P_{opt}$ and as a result, the real power command $P*$ is set to $P_{opt}$.

When the rotational speed $\omega$ exceeds the rated rotational speed $\omega_{max}$, the deviation $\Delta\omega_P$ ($=\omega-\omega_{max}$) is positive and the real power command $P*$ is always set to the power command upper limit $P_{max}$. Therefore, the real power command $P*$ is set to the rated power $P_{rated}$. In other words, the power control is set into the rated value control mode.

On the other hand, when the generator rotational speed $\omega$ is in a range in which the generator rotational speed $\omega$ is equal to or higher than the threshold rotational speed $\omega'_M$ and lower than the rated rotational speed $\omega_{max}$, the generator rotational speed $\omega$ is controlled to the rated rotational speed $\omega_{max}$ by the PI control and therefore the pitch angle command $\beta*$ is set to the fine-side limit value, that is, the minimum pitch angle $\beta_{min}$.

The correction of the pitch angle command $\beta*$ with the above-described correction value $\Delta\beta*$ effectively works when the generator rotational speed $\omega$ is higher than the rated rotational speed $\omega_{max}$ and the real power command $P*$ does not reach the rated power $P_{rated}$. Since the real power command $P*$ is smaller than the rated power $P_{rated}$, the deviation $\Delta P$ is negative and therefore the correction value $\Delta\beta*$ is also negative. As a result, the pitch angle command $\beta*$ becomes smaller than the pitch angle command baseline value $\beta_{in}*$, that is, the pitch angle $\beta$ becomes closer to the fine-side. This allows converting the aerodynamic energy into electric power more efficiently. When the real power command $P*$ reaches the rated power $P_{rated}$, the generator rotational speed $\omega$ is controlled to the rated rotational speed $\omega_{max}$ by the PI control.

Case (4): The generator rotational speed $\omega$ is higher than the threshold rotational speed $\omega'_M$ and the pitch angle $\beta$ does not reach the minimum pitch angle $\beta_{min}$.

In this case, the power control rotational speed command $\omega_P^*$ is set to the rated rotational speed $\omega_{max}$. Furthermore, the power command lower limit $P_{min}$ is set to smaller one of the one-operation-step previous real power command $P^*$ and the power command upper limit $P_{max}$ at the current operation step, and the power command upper limit $P_{max}$ is set to the rated power $P_{rated}$. As a result, the real power command $P^*$ is set to the rated power $P_{rated}$. In other words, the power control is kept in the rated value control mode even when the generator rotational speed $\omega$ is reduced below the rated rotational speed $\omega_{max}$. It is determined whether or not the pitch angle $\beta$ reaches the minimum pitch angle $\beta_{min}$ on the basis of whether the pitch angle command $\beta^*$ coincides with the minimum pitch angle $\beta_{min}$.

On the other hand, when the generator rotational speed $\omega$ is in a range in which the generator rotational speed $\omega$ is equal to or higher than the threshold rotational speed $\omega'_M$, and lower than the rated rotational speed $\omega_{max}$, the pitch angle command $\beta^*$ is controlled to the rated rotational speed $\omega_{max}$ by the PI control, and therefore the pitch angle command $\beta^*$ is set to the fine-side limit value, that is, the minimum pitch angle $\beta_{min}$.

The correction of the pitch angle command $\beta^*$ with the above-described correction value $\Delta\beta^*$ effectively works when the generator rotational speed $\omega$ is higher than the rated rotational speed $\omega_{max}$ and the real power command $P^*$ does not reach the rated power $P_{rated}$. Since the real power command $P^*$ is smaller than the rated power $P_{rated}$, the deviation $\Delta P$ is negative and therefore the correction value $\Delta\beta^*$ is also negative. As a result, the pitch angle command $\beta^*$ becomes smaller than the pitch angle command baseline value $\beta_{in}^*$, that is, the pitch angle $\beta$ becomes closer to the fine-side. This allows converting the aerodynamic energy into electric power more efficiently. When the real power command $P^*$ reaches the rated power $P_{rated}$, the generator rotational speed $\omega$ is controlled to the rated rotational speed $\omega_{max}$ by the PI control.

Case (5): The generator rotational speed $\omega$ is reduced below the threshold rotational speed $\omega'_M$, whereby the generator rotational speed $\omega$ is in a range higher than the intermediate rotational speed $\omega_M$.

In this case, the power control rotational speed command $\omega_P^*$ is set to the rated rotational speed $\omega_{max}$ by the selector 33, and the power command lower limit $P_{min}$ and the power command upper limit $P_{max}$ are set to $P_{opt}$ and $P_{rated}$, respectively. In this case, the real power command $P^*$ is always set to the power command lower limit $P_{min}$, since the deviation $\Delta\omega_P (=\omega-\omega_{max})$ is negative and the generator rotational speed $\omega$ is controlled to the rated rotational speed $\omega_{max}$ by the pitch control module 32. The real power command $P^*$ is eventually set to the optimized power value $P_{opt}$, since the power command lower limit $P_{max}$ is $P_{opt}$. In other words, the power control is switched from the rated value control mode to the optimum curve control mode.

Figure 7:
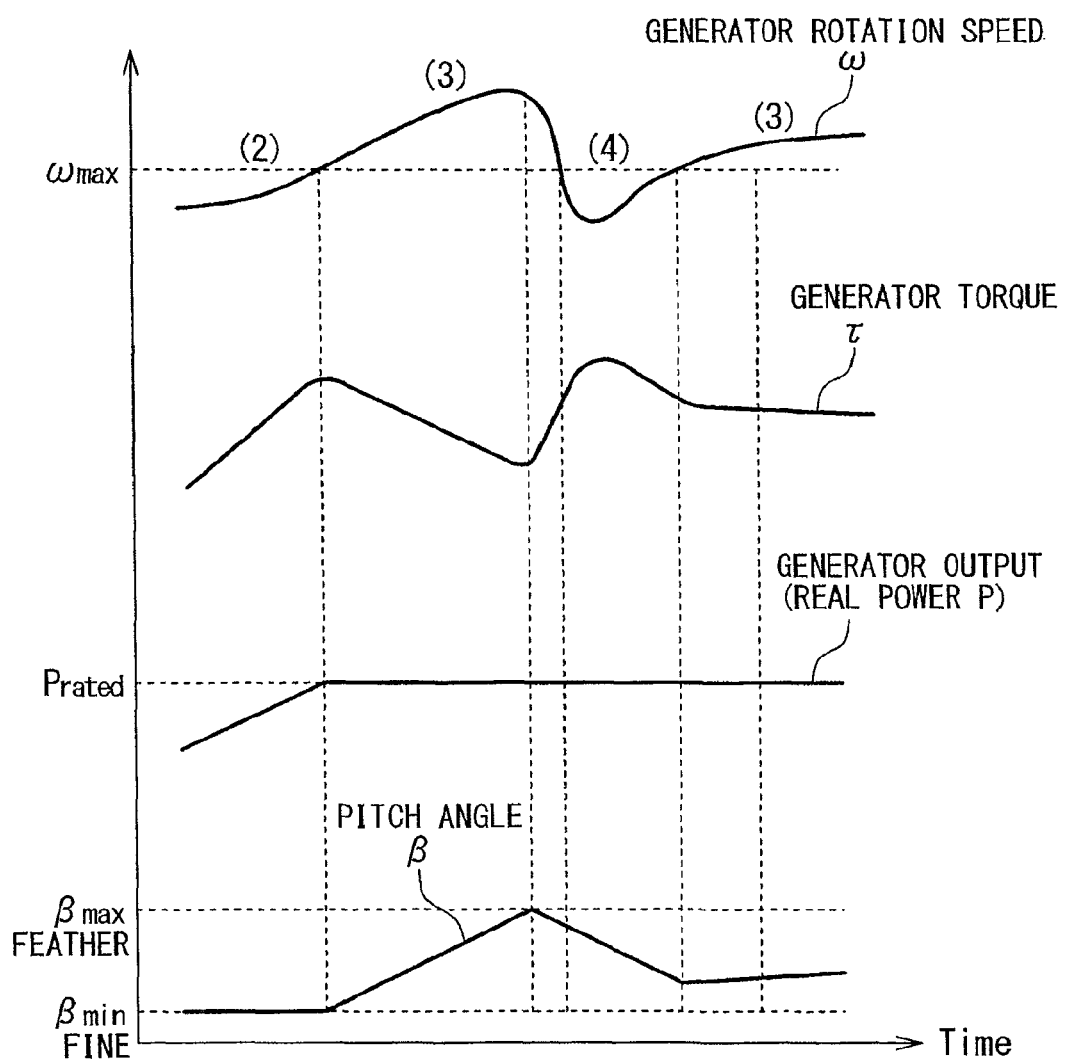
FIG. 7 is a graph showing an example of an operation performed by the wind turbine generator system of the present embodiment.

FIG. 7 is a graph showing an example of the operation performed by the wind turbine generator system 1 of this embodiment. The real power command $P^*$ is set to the optimized power value $P_{opt}$ until the generator rotational speed $\omega$ reaches the rated rotational speed $\omega_{max}$ after the wind turbine generator system 1 starts operating (the above-described Case (2)). Accordingly, the outputted real power P is increased as the generator rotational speed $\omega$ increases. The pitch angle command $\beta^*$ is set to the minimum pitch angle $\beta_{min}$ so as to allow the generator rotational speed $\omega$ to reach the rated rotational speed $\omega_{max}$.

When the generator rotational speed $\omega$ exceeds the rated rotational speed $\omega_{max}$, the real power command $P^*$ is set to the rated power $P_{rated}$ (the above-described Case (3)). Accordingly, the outputted real power P is kept at the rated power $P_{rated}$. Since the generator rotational speed $\omega$ exceeds the rated rotational speed $\omega_{max}$, the pitch angle command $\beta^*$ increases and the pitch angle $\beta$ is varied toward the feather-side limit value.

When a transitional wind null occurs, the generator rotational speed $\omega$ sharply decreases. The pitch control module 32 reduces the pitch angle command $\beta^*$ so as to maintain the generator rotational speed $\omega$ at the rated rotational speed $\omega_{max}$ to thereby reduce the pitch angle $\beta$, that is, to vary the pitch angle $\beta$ toward the fine side. Even when the generator rotational speed $\omega$ is reduced below the rated rotational speed $\omega_{max}$, the real power command $P^*$ is kept at the rated power $P_{rated}$ as long as the pitch angle $\beta$ does not reach the minimum pitch angle $\beta_{min}$. Therefore, the outputted real power P is also kept at the rated power $P_{rated}$.

In the operation shown in FIG. 7, the generator rotational speed $\omega$ returns to the rated rotational speed $\omega_{max}$ again before the pitch angle $\beta$ reaches the minimum pitch angle $\beta_{min}$, so that the real power P is kept at the rated power $P_{rated}$. In this way, the wind turbine generator system 1 of this embodiment suppresses the output power fluctuation when a transient wind null occurs. Furthermore, the wind turbine generator system 1 of this embodiment makes effective use of the rotational energy of the wind turbine rotor 7 and improves the generation efficiency, since the output power P is not reduced below the rated power $P_{rated}$ until the increase in the output coefficient of the wind turbine rotor 7 through the reduction in the pitch angle $\beta$ becomes impossible, when the generator rotational speed $\omega$ is reduced below the rated rotational speed $\omega_{max}$.

Figure 8:
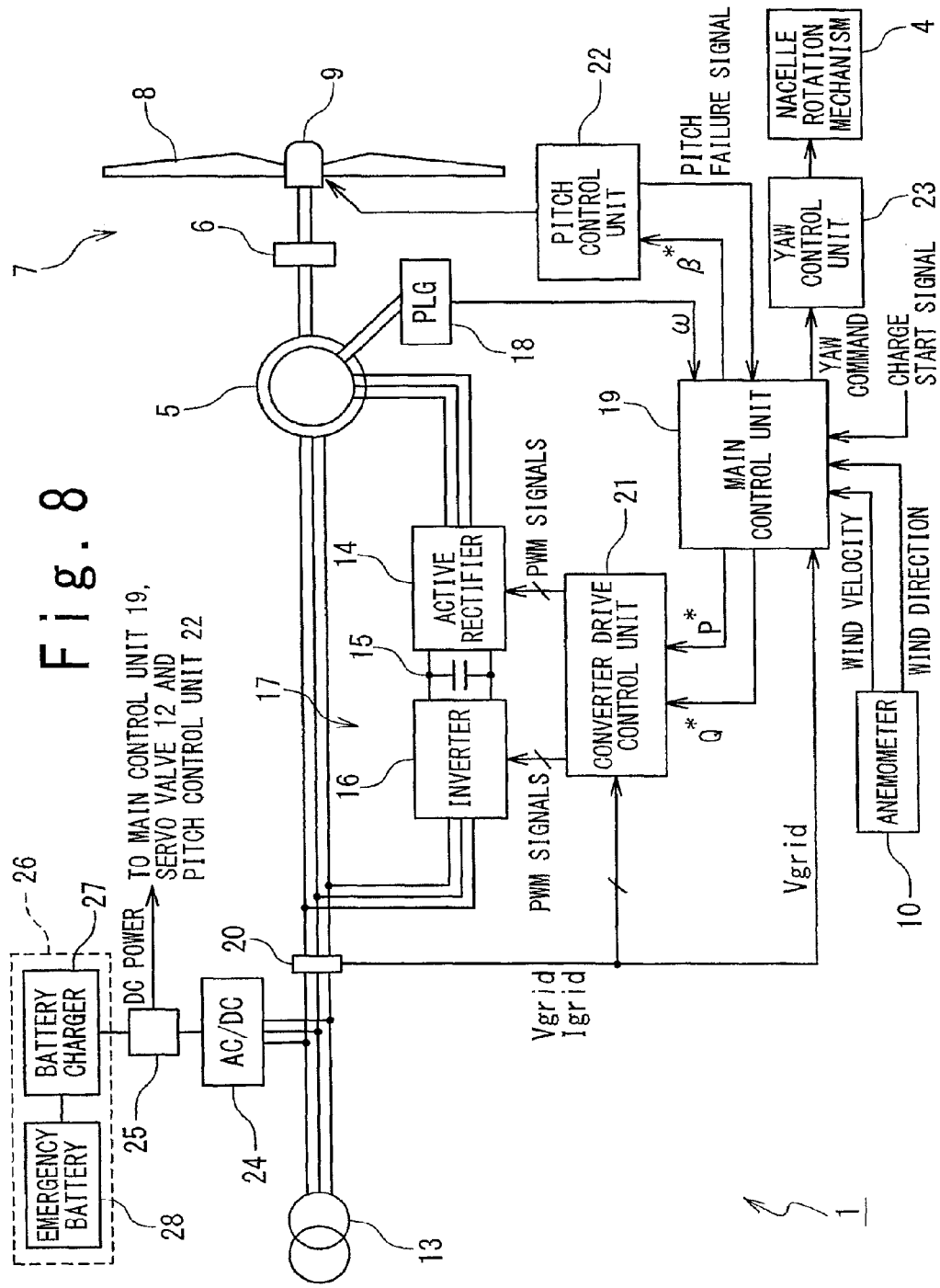
FIG. 8 is a block diagram showing another configuration of the wind turbine generator system of the present embodiment.

It is preferable that the wind turbine generator system 1 of this embodiment is configured to perform various control methods in accordance with various operating situations. FIG. 8 shows a preferred configuration of the wind turbine generator system 1 configured to perform controls accordingly to various operating situations.

Figure 9:
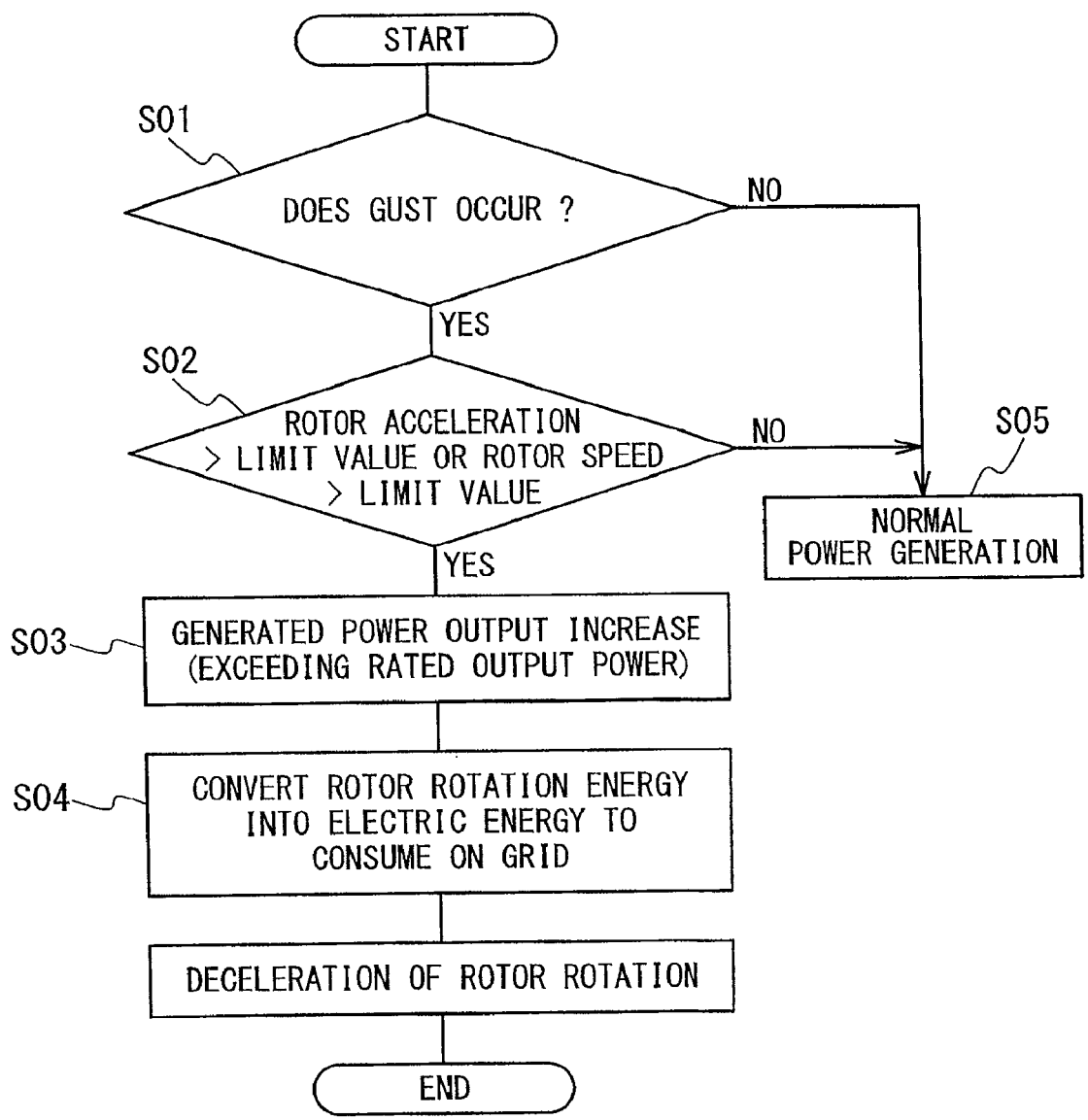
FIG. 9 is a flowchart of a preferred control performed by the wind turbine generator system of the present embodiment.

First, in the wind turbine generator system 1 shown in FIG. 8, the main control unit 19 detects an occurrence of a gust (rush of wind) by the wind speed an the wind direction measured by the anemometer 10. The main control unit 19 may detect the occurrence of the gust on the basis of the generator rotational speed $\omega$ in place of the wind speed and the wind direction. When the main control unit 19 detects the occurrence of the gust, the real power command $P^*$ is controlled so as not to excessively increase the rotational speed of the wind turbine rotor 7. Specifically, as shown in FIG. 9, when the occurrence of the gust is detected based on the wind speed and the wind direction (Step S01), the acceleration of the wind turbine rotor 7 (rotor acceleration) or the rotational speed of the wind turbine rotor 7 (rotor rotational speed) is monitored. When the rotor acceleration or the rotor rotational speed exceeds a predetermined limit value (Step S02), the real power command $P^*$ is increased (Step S03). When the real power command $P^*$ is controlled to the rated power $P_{rated}$ until just before the step S03, the real power command $P^*$ is controlled to be increased above the rated power $P_{rated}$. The rotational energy of the wind turbine rotor 7 is thereby converted into electric energy and consumed by the power grid 13. This decelerates the wind turbine rotor 7.

Moreover, the wind turbine generator system 1 shown in FIG. 8 is configured so that the nacelle rotation mechanism 4 moves the rotation plane of the wind turbine rotor 7 away from the windward direction to thereby stop the wind turbine rotor 7, when the pitch control unit 92 detects a failure in the pitch drive mechanism that drives the blades 8. To achieve this goal, the wind turbine generator system 1 shown in FIG. 8 is configured so that the pitch control unit 22 is adapted to detect a failure in the hydraulic cylinders 11 and/or the servo valves 12 shown in FIG. 2. The main control unit 19 generates a yaw command in response to the detection of the failure, when a failure is detected in the hydraulic cylinders 11 and/or the servo valve 12.

Figure 10:
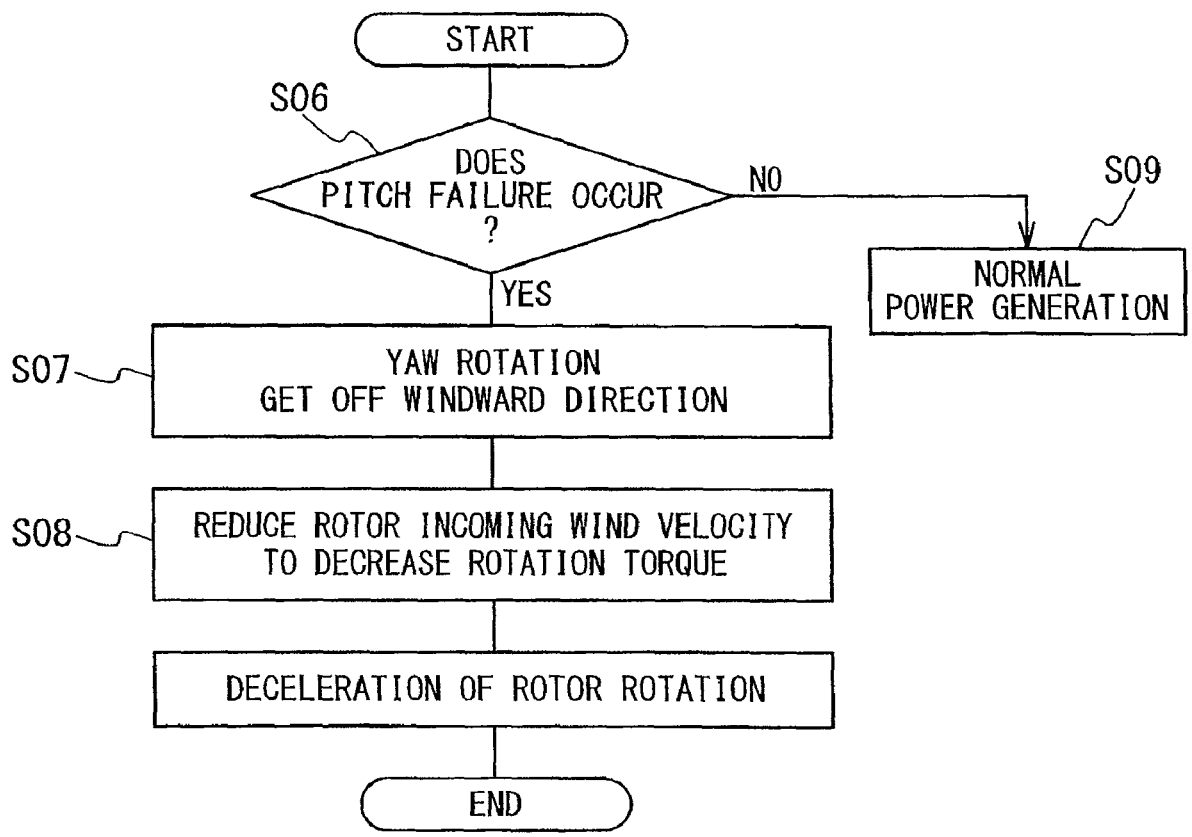
FIG. 10 is a flowchart of another preferred control performed by the wind turbine generator system of the present embodiment.

FIG. 10 shows a procedure of moving the rotation plane away from the windward direction. When the pitch control unit 22 detects a failure in the hydraulic cylinders 11 and/or the servo valves 12 (Step S06), a pitch failure signal is activated. In response to the activation of the pitch failure signal, the main control unit 19 controls the yaw angle of the nacelle 3, thereby moving the rotation plane of the wind turbine rotor 7 away from the windward direction (step S07). The windward direction can be determined from the wind direction measured by the anemometer 10. By moving the rotation plane of the wind turbine rotor 7 away from the windward direction, the wind speed of wind flowing in the wind turbine rotor 7 is reduced and the rotational torque is reduced (Step S08). As a result, the wind turbine rotor 7 is decelerated and stopped.

Figure 11:
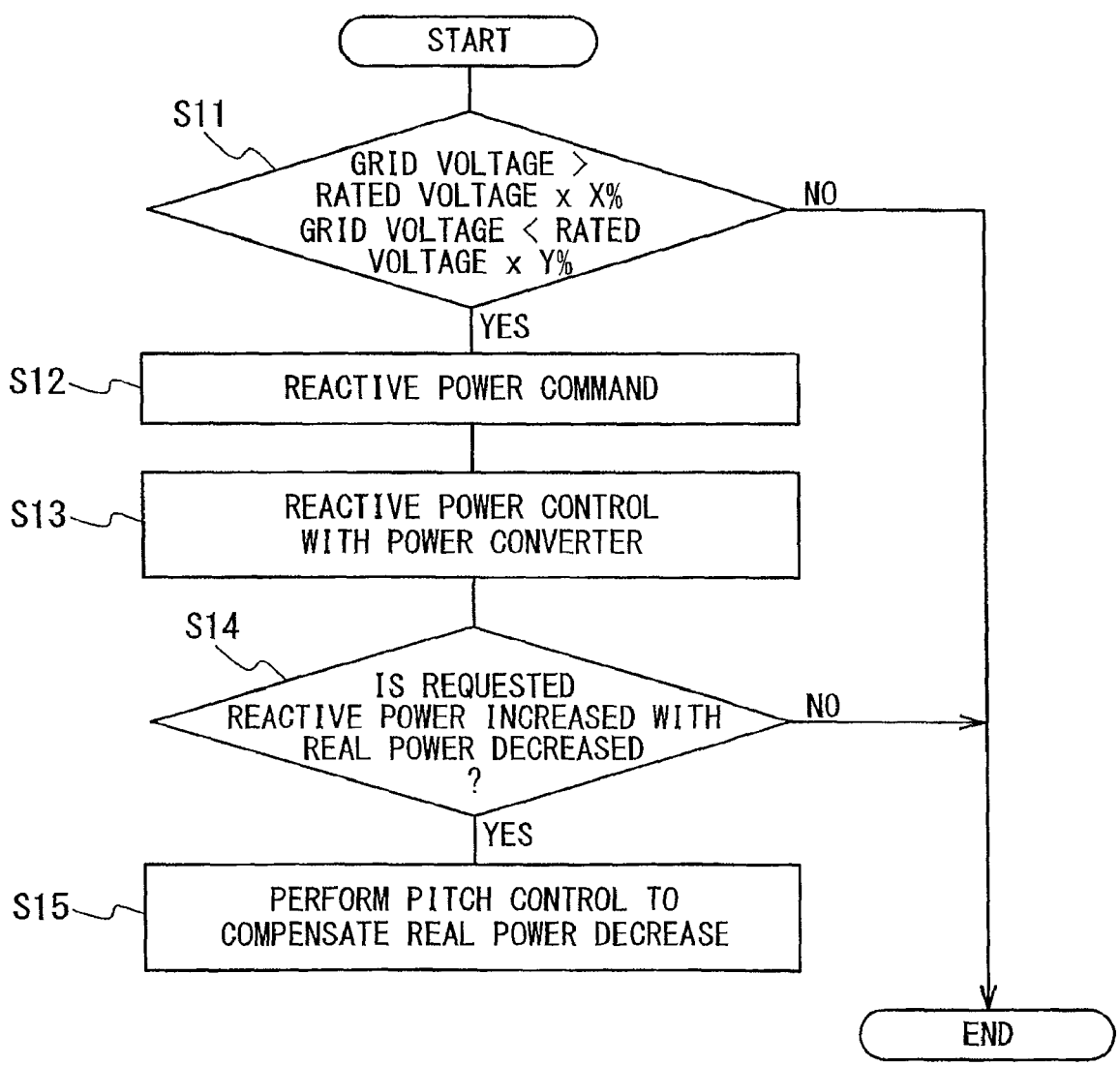
FIG. 11 is a flowchart of still another preferred control performed by the wind turbine generator system of the present embodiment.

In addition, the wind turbine generator system 1 shown in FIG. 8 is configured so as to control the reactive power Q supplied to the power grid 13 when the grid voltage $V_{grid}$ is excessively increased or decreased, and to perform a pitch control in response to the reactive power Q. FIG. 11 is a flowchart showing procedures of such control.

When the grid voltage $V_{grid}$ is increased above X % of a predetermined rated voltage $V_{rated}$ (where X is a predetermined value larger than 100) or is reduced below Y % of the predetermined rated voltage $V_{rated}$ (where Y is a predetermined value smaller than 100) (Step S11), the power factor command fed to the power control module 31 is modified (Step S12). The modified power factor command may be fed from a control system of the power grid 13; instead, the main control unit 19 may in itself modify the power factor command in accordance with the grid voltage $V_{grid}$. This results in that the reactive power command Q* is reduced when the grid voltage $V_{grid}$ exceeds X % of the predetermined rated voltage $V_{rated}$, and that the reactive power command Q* is increased when the grid voltage $V_{grid}$ is reduce below Y % of the predetermined rated voltage $V_{rated}$. Since the apparent power S supplied from the wind turbine generator system 1 to the power grid 13 is constant, the real power command P* is increased when the reactive power command Q* is reduced, while the real power command P* is reduced when the reactive power command Q* is increased. The AC-DC-AC converter 17 is controlled in response to the real power command P* and the reactive power command Q*, thereby controlling the reactive power Q supplied to the power grid 13 (step S13).

When the reactive power command Q* is largely increased, the real power command P* is reduced, and this causes reduction in the output of the wind turbine generator system 1. To avoid such a problem, the pitch angle command β* is reduced (that is, the pitch angle command β* is varied toward the fine side) when the increase in the reactive power command Q* is larger than a predetermined increase amount, thereby increasing the real power P (step S15).

When the reactive power command Q* is largely reduced, the real power command P* is increased, and this unnecessarily increases the output of the wind turbine generator system 1. To avoid such a problem, the pitch angle command β* is increased (that is, the pitch angle command β* is varied toward the feature side) when the decrease in the reactive power command Q* is larger than a predetermined decrease amount, thereby reducing the real power P.

Figure 12:
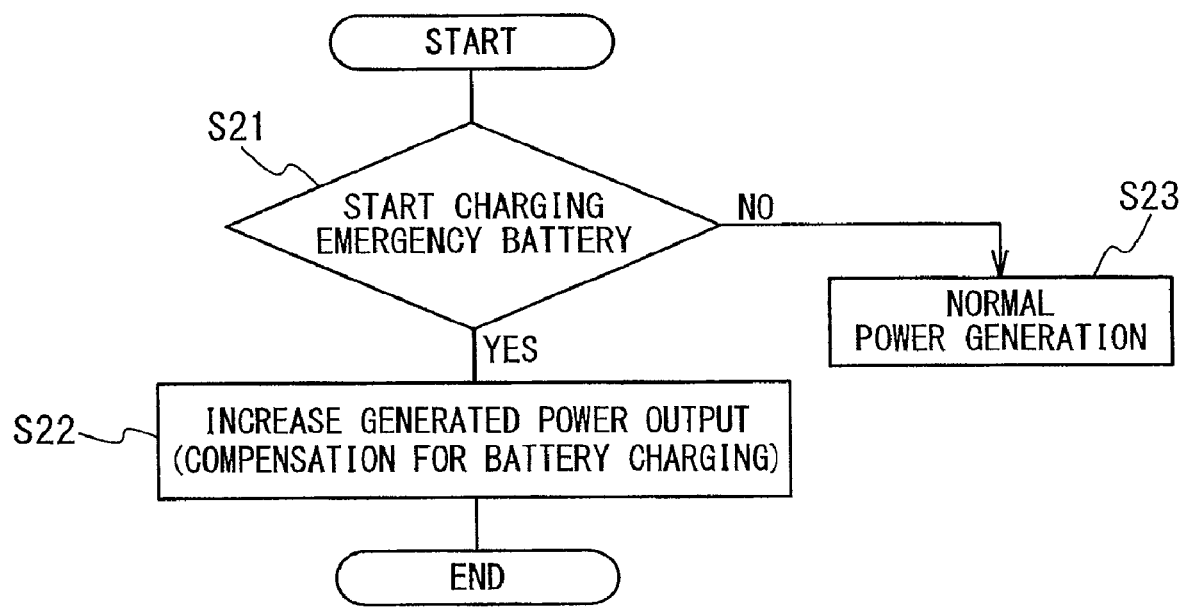
FIG. 12 is a flowchart of still another preferred control performed by the wind turbine generator system of the present embodiment.

Furthermore, the wind turbine generator system 1 shown in FIG. 8 is configured so as to increase the outputted real power P while the emergency battery 28 is charged. This addresses compensation for power used to charge the emergency battery 28. Specifically, as shown in FIG. 12, when the battery charger 27 starts charging the emergency battery 28 (step S21), the battery charger 27 activates a charge start signal. The main control unit 19 increases the real power command P* in response to the activation of the charge start signal (step S22). The increase amount of the real power command P* is set to be equal to the amount of the power used to charge the emergency battery 28. When the emergency battery 28 is not charged, the real power command P* generated by the PI controller 35 is used to control the AC-DC-AC converter 17.

It should be noted that the present invention is not to be interpreted to be limited to the above-stated embodiments. For example, although the wind turbine generator system 1 of this embodiment is a doubly-fed variable speed wind turbine system, the present invention is also applicable to other kinds of wind turbine generator system capable of varying both the rotational speed of the wind turbine rotor and the pitch angle. For example, the present invention is applicable to a wind turbine generator system configured so that an AC-DC-AC converter converts all the AC power generated by the generator into AC power adapted to the frequency of the power grid.

Further, the emergency battery 28 may be charged not with the power received from the power grid but with the power outputted from the generator.

Moreover, it is apparent for the person skilled in the art that the rotational speed of the wind turbine rotor 7 may be used in place of the generator rotational speed ω, since the rotational speed of the wind turbine rotor 7 depends on the generator rotational speed ω. For example, as is the case of this embodiment, the rotational speed of the wind turbine rotor 7 has one-to-one correspondence to the generator rotational speed ω when the wind turbine rotor 7 is connected to the wound-rotor induction generator 5 through the gear 6. The rotational speed of the wind turbine rotor 7 can be used in place of the generator rotational speed ω, even when a continuously variable transmission such as a toroidal transmission is used in place of the gear 6; the generator rotational speed ω increases in accordance with an increase in the rotational speed of the wind turbine rotor 7.

What is claimed is:

1. A wind turbine generator system comprising:
   a wind turbine rotor including a blade whose pitch angle is variable;
   a generator driven by said wind turbine rotor; and
   a control unit controlling output power of said generator and said pitch angle of said blade in response to a rotational speed of said wind turbine rotor or said generator,
   wherein said control unit performs a first control in which said output power is controlled in accordance with a predetermined power-rotational speed curve until said rotational speed is increased to reach a predetermined rated rotational speed, and performs a second control in which said output power is controlled to a predetermined rated power when said rotational speed exceeds said rated rotational speed, and
   wherein, when said rotational speed is reduced below said rated rotational speed after said control unit is once set to the state of performing said second control, said control unit maintains the state of performing said second control for a case when said pitch angle is larger than a predetermined pitch angle, and does not switch to the state of performing said first control until said pitch angle reaches said predetermined pitch angle, and said control unit is switched to the state of performing said first control irrespectively of said pitch angle, when said rotational speed is reduced below a predetermined threshold rotation speed which is lower than said rated rotational speed after said control unit is once placed into the state of performing said second control.

2. The wind turbine generator system according to claim 1, wherein said control unit controls said pitch angle in response to a difference between said rotational speed and a predetermined rated rotational speed and a difference between said output power and said rated power.

3. The wind turbine generator system according to claim 2, wherein said control unit controls said pitch angle so as to reduce said pitch angle when said output power is less than said rated power.

4. The wind turbine generator system according to claim 1, wherein said control unit increases the output power of said generator in response to said rotational speed when detecting a gust.

5. The wind turbine generator system according to claim 1, further comprising:
 a rotation mechanism rotating a rotation plane of the wind turbine rotor; and
 a wind direction detector detecting a windward direction,
 wherein said wind turbine rotor includes a pitch drive mechanism driving said blade, and
 wherein, when said control unit detects a failure of said pitch drive mechanism, said control unit control said rotation mechanism to move the rotation plane of said wind turbine rotor away from said windward direction.

6. The wind turbine generator system according to claim 1, wherein said control unit is responsive to a voltage of a power grid connected to said generator for controlling a reactive power outputted from said generator to said power grid, controlling said pitch angle in response to said reactive power.

7. The wind turbine generator system according to claim 1, further comprising:
 an emergency battery; and
 a battery charger charging said emergency battery with power received from said power grid,
 wherein said wind turbine rotor includes a pitch drive mechanism driving said blade,
 wherein said emergency battery supplies power to said pitch drive mechanism and said control unit when a voltage of the power grid connected to the generator is decreased,
 wherein said control unit controls said output power so as to increase said output power while said emergency battery is charged.

8. A control method of a wind turbine generator system including a wind turbine rotor including a blade whose pitch angle is variable and a generator driven by said wind turbine rotor, said control method comprising:
 controlling output power of said generator and said pitch angle of said blade in response to a rotational speed of said wind turbine rotor or said generator,
 wherein said controlling includes:
  performing a first control in which said output power is controlled in accordance with a predetermined power-rotational speed curve, until said rotational speed is increased to reach a predetermined rated rotational speed;
  performing a second control in which said output power is controlled to a predetermine rated power when said rotational speed exceeds said rated rotational speed;
  in response to said pitch angle, maintaining a state of performing said second control or switching to a state of performing said first control, when said rotational speed is reduced below said rated rotational speed after the state of performing said second control is once established; and
  switching to the state of performing said first control irrespectively of said pitch angle, when said rotational speed is reduced below a predetermined threshold rotation speed which is lower than said rated rotational speed after said control unit is once placed into the state of performing said second control.

* * * * *